United States Patent
Oh et al.

(10) Patent No.: US 10,223,537 B2
(45) Date of Patent: Mar. 5, 2019

(54) METHOD AND ELECTRONIC DEVICE FOR MANAGING DATA

(71) Applicant: Samsung Electronics Co., Ltd., Gyeonggi-do (KR)

(72) Inventors: Young Hak Oh, Seoul (KR); Eun Young Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/989,543

(22) Filed: Jan. 6, 2016

(65) Prior Publication Data

US 2016/0196435 A1    Jul. 7, 2016

(30) Foreign Application Priority Data

Jan. 6, 2015   (KR) .......................... 10-2015-0000986

(51) Int. Cl.
*H04L 29/06* (2006.01)
*G06F 21/60* (2013.01)
(Continued)

(52) U.S. Cl.
CPC .......... *G06F 21/60* (2013.01); *G06F 21/6218* (2013.01); *G06F 21/78* (2013.01);
(Continued)

(58) Field of Classification Search
CPC ...... G06F 21/60; G06F 21/78; G06F 21/6218; G06F 2221/2107; H04L 63/0428;
(Continued)

(56) References Cited

U.S. PATENT DOCUMENTS 7,093,137 B1 * 8/2006 Sato .................... G06F 21/6227
                                                                 380/277
7,373,506 B2 * 5/2008 Asano .................... G06F 21/10
                                                                 380/200
(Continued)

FOREIGN PATENT DOCUMENTS

CN         1745555          3/2006
CN        101401341         4/2009
(Continued)

OTHER PUBLICATIONS

European Search Report dated May 3, 2016 issued in counterpart application No. 16150177.0-1870, 7 pages.
(Continued)

*Primary Examiner* — David Garcia Cervetti
(74) *Attorney, Agent, or Firm* — The Farrell Law Firm, P.C.

(57) ABSTRACT

An electronic device is provided. The electronic device includes a memory configured to store at least one application, a communication module configured to establish a connection between the electronic device and an external electronic device, and a processor configured to drive the at least one application, divide data executable by the at least one application into a first file and a second file, store the first file in the memory, and transmit the second file to the external electronic device through the communication module for storing the second file in the external electronic device.

18 Claims, 15 Drawing Sheets

(51) Int. Cl.
| | |
|---|---|
| *G06F 21/62* | (2013.01) |
| *G06F 21/78* | (2013.01) |
| *H04L 9/08* | (2006.01) |
| *H04L 9/06* | (2006.01) |
| *H04W 4/21* | (2018.01) |
| *H04W 4/80* | (2018.01) |
| *H04L 29/08* | (2006.01) |
| *H04W 4/00* | (2018.01) |
| *H04W 4/20* | (2018.01) |
| *H04W 12/00* | (2009.01) |

(52) U.S. Cl.
CPC ............ *H04L 9/0618* (2013.01); *H04L 9/085* (2013.01); *H04L 9/0863* (2013.01); *H04L 9/0866* (2013.01); *H04L 63/0428* (2013.01); *H04L 63/083* (2013.01); *H04L 67/1097* (2013.01); *H04W 4/008* (2013.01); *H04W 4/206* (2013.01); *H04W 4/21* (2018.02); *H04W 4/80* (2018.02); *H04W 12/00* (2013.01); *G06F 2221/2107* (2013.01)

(58) Field of Classification Search
CPC . H04L 63/083; H04L 9/0866; H04L 67/1097; H04L 9/085; H04L 9/0618; H04L 9/0863; H04W 4/206; H04W 12/00; H04W 4/008
See application file for complete search history.

(56) References Cited

U.S. PATENT DOCUMENTS

| | | | | |
|---|---|---|---|---|
| 7,599,972 B2* | 10/2009 | Dodge | ................. | G06F 3/0608 |
| 7,975,065 B2* | 7/2011 | Dunning | ........... | G06F 17/30017 |
| | | | | 709/232 |
| 8,009,830 B2 | 8/2011 | Orsini et al. | | |
| 8,051,205 B2* | 11/2011 | Roy | ................. | G06F 17/30206 |
| | | | | 709/244 |
| 8,078,869 B2 | 12/2011 | Adams et al. | | |
| 8,320,560 B2 | 11/2012 | Orsini et al. | | |
| 8,379,866 B2 | 2/2013 | Yang et al. | | |
| 8,386,778 B2 | 2/2013 | Adams et al. | | |
| 8,417,966 B1* | 4/2013 | Mooneyham | ......... | H04L 9/3236 |
| | | | | 713/189 |
| 8,621,036 B1* | 12/2013 | L'Heureux | ............. | G06F 21/62 |
| | | | | 709/217 |
| 8,644,502 B2 | 2/2014 | Orsini et al. | | |
| 8,732,479 B1* | 5/2014 | Henriksen | ........... | G06F 11/1464 |
| | | | | 709/201 |
| 8,874,908 B2 | 10/2014 | Raudaschl | | |
| 9,154,469 B2 | 10/2015 | Adams et al. | | |
| 9,317,705 B2 | 4/2016 | O'Hare et al. | | |
| 9,524,391 B2 | 12/2016 | Ham | | |
| 9,641,323 B2* | 5/2017 | Kim | ......... | H04L 9/08 |
| 9,697,225 B2* | 7/2017 | Yun | ................. | G06F 17/30174 |
| 9,716,694 B2* | 7/2017 | Yasaki | ................ | H04L 63/0428 |
| 9,781,123 B2* | 10/2017 | Kim | ......... | H04L 51/32 |
| 9,971,493 B2* | 5/2018 | Murata | ............. | G06F 3/04855 |
| 2003/0023862 A1* | 1/2003 | Yamasaki | ............. | G06Q 30/06 |
| | | | | 713/194 |
| 2005/0021539 A1* | 1/2005 | Short | ...... | H03M 7/40 |
| 2006/0190724 A1 | 8/2006 | Adams et al. | | |
| 2007/0245402 A1* | 10/2007 | Kim | ................. | G11B 20/00086 |
| | | | | 726/2 |
| 2008/0154851 A1* | 6/2008 | Jean | ................. | G06F 17/30206 |
| 2008/0301775 A1 | 12/2008 | Ollikainen et al. | | |
| 2009/0100446 A1* | 4/2009 | Dekker | ................ | G06Q 20/341 |
| | | | | 719/328 |
| 2009/0135757 A1* | 5/2009 | Lee | ................. | H04B 7/18582 |
| | | | | 370/316 |
| 2009/0214024 A1* | 8/2009 | Schneider | ............. | H04L 9/0625 |
| | | | | 380/28 |
| 2009/0316899 A1* | 12/2009 | Kim | ..................... | H04L 9/0637 |
| | | | | 380/255 |
| 2010/0128876 A1 | 5/2010 | Yang et al. | | |
| 2010/0162004 A1* | 6/2010 | Dodgson | ............... | G06F 21/805 |
| | | | | 713/193 |
| 2010/0180044 A1* | 7/2010 | Olsson | .................... | H04L 65/60 |
| | | | | 709/231 |
| 2010/0281520 A1* | 11/2010 | Deguchi | ................. | G06F 21/31 |
| | | | | 726/3 |
| 2011/0138454 A1* | 6/2011 | Mansour | ............... | H04L 9/3218 |
| | | | | 726/9 |
| 2011/0185177 A1* | 7/2011 | Spalka | .................... | H04L 9/302 |
| | | | | 713/171 |
| 2011/0202755 A1* | 8/2011 | Orsini | ................... | H04L 63/029 |
| | | | | 713/151 |
| 2011/0208891 A1* | 8/2011 | Meyers | ................. | G06F 13/385 |
| | | | | 710/313 |
| 2011/0258439 A1 | 10/2011 | Orsini et al. | | |
| 2011/0317839 A1* | 12/2011 | Yoneda | .................. | H04L 9/085 |
| | | | | 380/270 |
| 2012/0047154 A1* | 2/2012 | Lin | ....................... | G06F 3/0608 |
| | | | | 707/756 |
| 2012/0047339 A1* | 2/2012 | Decasper | ............ | G06F 11/1076 |
| | | | | 711/162 |
| 2012/0054500 A1* | 3/2012 | Dhuse | ................. | G06F 11/1076 |
| | | | | 713/189 |
| 2012/0072722 A1 | 3/2012 | Adams et al. | | |
| 2012/0072723 A1* | 3/2012 | Orsini | ................ | G06F 21/6209 |
| | | | | 713/165 |
| 2012/0079095 A1* | 3/2012 | Evans | ....................... | G06F 8/61 |
| | | | | 709/224 |
| 2012/0137095 A1* | 5/2012 | Grube | ................. | G06F 12/0638 |
| | | | | 711/162 |
| 2012/0166576 A1* | 6/2012 | Orsini | ................ | G06F 11/1471 |
| | | | | 709/217 |
| 2012/0216234 A1* | 8/2012 | Kemp | ................. | H04N 21/2225 |
| | | | | 725/110 |
| 2012/0226772 A1* | 9/2012 | Grube | ................. | H04L 67/1097 |
| | | | | 709/217 |
| 2012/0300931 A1* | 11/2012 | Ollikainen | .......... | G06F 21/6272 |
| | | | | 380/262 |
| 2013/0013931 A1* | 1/2013 | O'Hare | ............... | H04L 9/0822 |
| | | | | 713/189 |
| 2013/0064364 A1 | 3/2013 | Orsini et al. | | |
| 2013/0117579 A1 | 5/2013 | Ham | | |
| 2013/0136264 A1* | 5/2013 | Kim | .......... | H04L 9/08 |
| | | | | 380/278 |
| 2013/0166908 A1 | 6/2013 | Adams et al. | | |
| 2013/0185569 A1* | 7/2013 | Xu | ...................... | G06F 21/6209 |
| | | | | 713/189 |
| 2013/0275776 A1* | 10/2013 | Baptist | ................ | H04L 67/1097 |
| | | | | 713/193 |
| 2013/0325952 A1* | 12/2013 | Draznin | ............... | H04N 21/4126 |
| | | | | 709/204 |
| 2014/0025746 A1* | 1/2014 | Rhee | ................ | H04L 67/306 |
| | | | | 709/204 |
| 2014/0026017 A1* | 1/2014 | Grube | ................ | G06F 11/1076 |
| | | | | 714/770 |
| 2014/0108796 A1* | 4/2014 | Johnson | ................ | G06F 21/6272 |
| | | | | 713/167 |
| 2014/0108807 A1 | 4/2014 | Orsini et al. | | |
| 2014/0123237 A1* | 5/2014 | Gaudet | ................... | H04L 63/08 |
| | | | | 726/4 |
| 2014/0129830 A1* | 5/2014 | Raudaschl | .......... | G06F 21/6218 |
| | | | | 713/165 |
| 2014/0230022 A1* | 8/2014 | Yuasa | ................... | H04L 63/107 |
| | | | | 726/4 |
| 2014/0244834 A1* | 8/2014 | Guedalia | .................. | H04L 67/16 |
| | | | | 709/224 |
| 2014/0297776 A1* | 10/2014 | Volvovski | ......... | G06F 17/30194 |
| | | | | 709/212 |
| 2014/0310337 A1* | 10/2014 | Kim | .................... | H04L 67/10 |
| | | | | 709/203 |
| 2014/0333528 A1* | 11/2014 | Murata | ............... | G06F 3/04855 |
| | | | | 345/156 |
| 2015/0006645 A1* | 1/2015 | Oh | ...................... | H04L 65/1096 |
| | | | | 709/206 |

(56) References Cited

U.S. PATENT DOCUMENTS

| | | | |
|---|---|---|---|
| 2015/0012843 A1* | 1/2015 | Ouyang | H04L 65/403 715/753 |
| 2015/0067421 A1* | 3/2015 | Baptist | H04L 67/1097 714/723 |
| 2015/0074430 A1 | 3/2015 | O'Hare et al. | |
| 2015/0106626 A1* | 4/2015 | Kremp | H04L 63/06 713/189 |
| 2015/0195090 A1* | 7/2015 | Obana | H04L 9/3231 380/30 |
| 2015/0256352 A1* | 9/2015 | Yang | H04L 67/06 715/753 |
| 2015/0312260 A1* | 10/2015 | Kim | H04L 51/32 713/152 |
| 2015/0312759 A1* | 10/2015 | Kim | G06F 21/10 455/411 |
| 2015/0341324 A1* | 11/2015 | Kshirsagar | H04L 63/0428 713/150 |
| 2015/0378616 A1* | 12/2015 | Khadiwala | G06F 3/0659 711/114 |
| 2016/0036822 A1* | 2/2016 | Kim | H04L 67/1097 726/4 |
| 2016/0065547 A1* | 3/2016 | Heinrich | G06F 17/30091 713/171 |
| 2016/0182486 A1* | 6/2016 | Wu | G06F 21/6209 726/28 |

FOREIGN PATENT DOCUMENTS

| | | |
|---|---|---|
| CN | 103218570 | 7/2013 |
| JP | 2007-122336 | 5/2007 |
| KR | 10-2010-0057314 | 5/2010 |

OTHER PUBLICATIONS

Chinese Office Action dated Mar. 28, 2018 issued in counterpart application No. 201610007262.X, 18 pages.

* cited by examiner

METHOD AND ELECTRONIC DEVICE FOR MANAGING DATA

PRIORITY

This application claims priority under 35 U.S.C. § 119(a) to Korean Patent Application Serial number 10-2015-0000986, which was filed on Jan. 6, 2015 in the Korean Intellectual Property Office, the entire disclosure of which is incorporated herein by reference.

BACKGROUND

1. Field of the Disclosure

The present disclosure relates generally an electronic device, and more particularly, to an electronic device that utilizes a method for managing data.

2. Description of the Related Art

Electronic devices such as a smartphone, a tablet PC, and the like support various functions such as image shooting, paperwork, Internet search, and the like, as well as call and message functions.

Meanwhile, leakage or unauthorized access of secret files, e.g., documents, images, etc., stored in the electronic device by a user is an increasing problem. For example, a person, e.g., a hacker, can take a secret file stored in an electronic device of a person by hacking that electronic device. Furthermore, one or more members working on a team can leak a secret document to another person, or a person who picks up another person's electronic device can view, steal, or leak a private image from that electronic device.

Password-type encryption can be used to decrease the unauthorized taking, viewing, etc., of files stored in an electronic device. However, if a password is known or an encryption algorithm is cracked, the password-type encryption cannot guarantee that the files on the electronic device will remain secure.

Furthermore, the password-type encryption is not a practical form of protection for securing documents in certain circumstances, for example, in the case where a plurality of team members have access to the electronic device.

SUMMARY

The present disclosure has been made to address at least the above-mentioned problems and/or disadvantages and to provide at least the advantages described below. Accordingly, an aspect of the present disclosure is to protect data stored in one or more electronic devices.

In accordance with an aspect of the present invention, there is provided an electronic device. The electronic device includes a memory configured to store at least one application, a communication module configured to establish a connection between the electronic device and an external electronic device, and a processor configured to drive the at least one application, divide data executable by the at least one application into a first file and a second file, store the first file in the memory, and transmit the second file to the external electronic device through the communication module for storing the second file in the external electronic device.

In accordance with an aspect of the present invention, there is provided a data managing method of an electronic device. The method includes dividing data executable by at least one application into a first file and a second file, storing the first file in a memory of the electronic device, and transmitting the second file to an external electronic device for storing the second file in the external electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
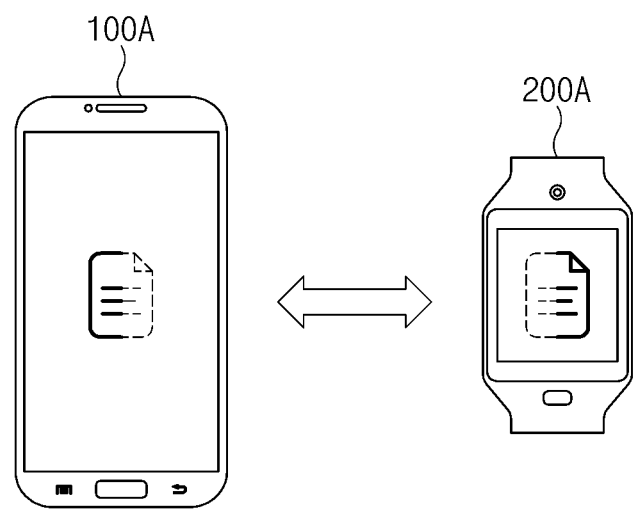
FIGS. 1A and 1B are diagrams illustrating various electronic devices that may use a data managing method, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be replaced with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

The terms used in describing the various embodiments of the present disclosure are just for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

An electronic device according to the various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

Hereinafter, electronic devices according to an embodiment of the present disclosure will be described with reference to the accompanying drawings. The term "user" as used herein may refer to a person who uses an electronic device or may refer to a device (e.g., an artificial electronic device) that uses an electronic device.

Figure 1B:
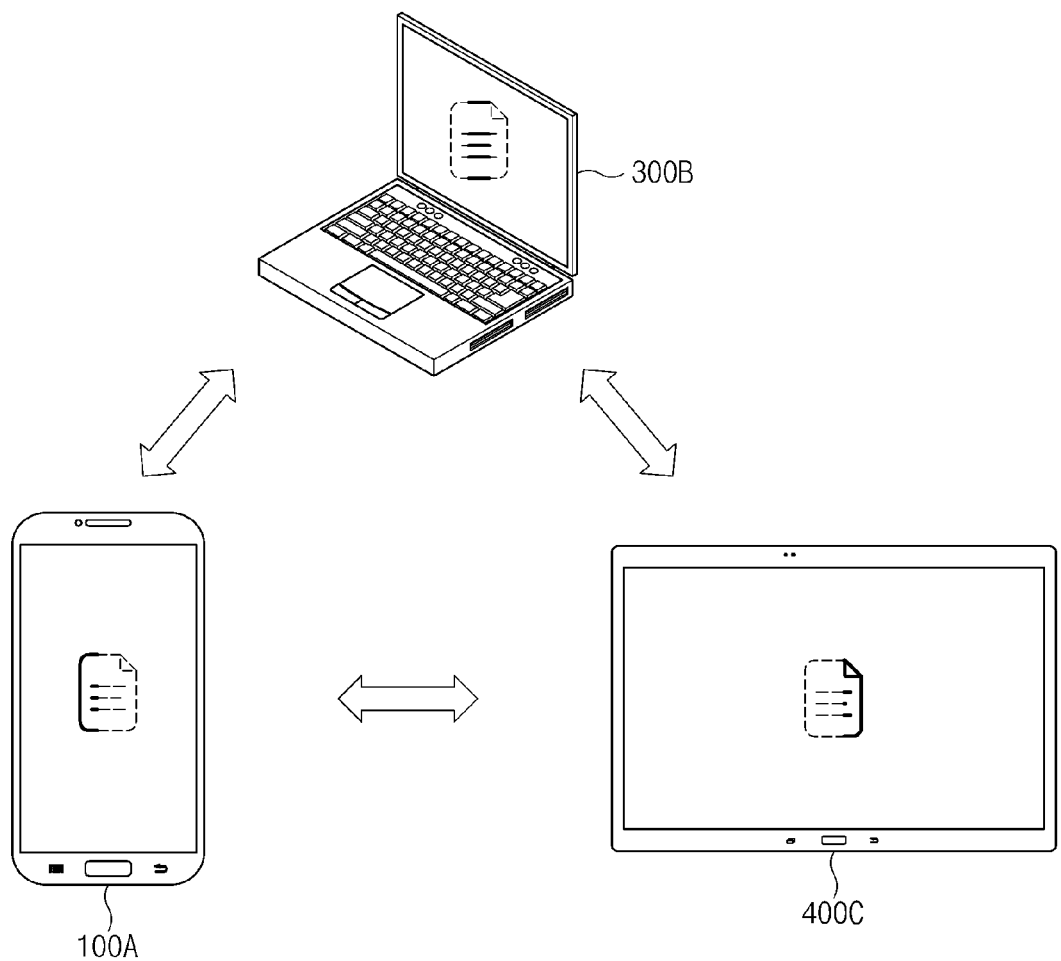

FIGS. 1A and 1B are diagrams illustrating various electronic devices that may use a data managing method, according to an embodiment of the present disclosure.

Referring to. FIG. 1A, electronic devices 100A and 200A, which belong to a user A, are illustrated. The electronic device 100A may be a smartphone, and the electronic device 200A may be a wearable device (e.g., a smart watch). A connection between the electronic devices 100A and 200A may be established through one or more wireless local area networks, such as Bluetooth secure simple pairing (SPP).

The electronic device 100A may obtain data from the user A or from another electronic device. For example, the electronic device 100A may obtain image data through a camera mounted thereon or may obtain document data transmitted from the electronic device 200A.

The electronic device 100A may generate a first file and a second file by splitting/dividing the obtained data. The electronic device 100A may store the first file in a memory of the first electronic device 100A. Furthermore, the electronic device 100A may transmit the second file to the electronic device 200A.

The first file, stored in the memory of the electronic device 100A, may not be executed or outputted through one or more applications that are capable of executing data before splitting the obtained data. For example, in searching for executable data files, the application may not inform the user A of the existence of the first file, may not provide a preview (e.g., a thumbnail, an icon, or the like) of the first file, or may prohibit execution of the first file. Similarly, the second file may not be executed or outputted through an application driven on the electronic device 200A.

Since the first file and the second file are respectively stored in the electronic devices 100A and 200A, a user of each of the electronic devices 100A and 200A may not be able to read or edit a part or all of data before splitting the data. For example, even though the user A loses the electronic device 100A, any other user who picks up the electronic device 100A may not be able to read or edit a part or all of data before splitting the data as long as the user A keeps or maintains control of the electronic device 200A.

Meanwhile, in the case where the user A intends to use data before splitting the data, the user A may drive an application on the electronic device 100A which stores the first file. If the application is driven, the electronic device 100A may determine whether a connection with the electronic device 200A is established. If the connection with the electronic device 200A is determined as being established, the electronic device 100A may transmit a message, which requests that the second file stored in the electronic device 200A be transmitted to the electronic device 100A, to the electronic device 200A. When the second file is received (or obtained) from the electronic device 200A in response to the message, the electronic device 100A may restore data based on the first file, stored in the memory, and the second file, thereby making it possible for the user A to execute a data file through the application.

Referring to FIG. 1B, the electronic device 100A of the user A, an electronic device 300B of a user B, and an electronic device 400C of a user C are illustrated. For example, the electronic device 100A, the electronic device 300B, and the electronic device 400C may correspond to a smartphone, a laptop, and a tablet PC, respectively. The electronic devices 100A, 300B, and 400C may be connected to each other using a wireless local area network (WLAN) (e.g., Wi-Fi direct, NFC, or the like).

The users A, B, and C may jointly work with data using their electronic devices 100A, 300B, and 400C. For example, the users A, B, and C may jointly make a document data file while performing the same project. The document data file may be respectively obtained by the electronic devices 100A, 300B, and 400C, and each of the users A, B, and C of the electronic devices 100A, 300B, and 400C may read or edit the document data file thus obtained.

If the work project of the users A, B, and C is completed, the electronic device 100A may split the document data file to create a first file, a second file, and a third file. The electronic device 100A may store the first file in a memory included therein and may transmit the second file and the third file to the electronic device 300B and the electronic device 400C, respectively. In this case, the document data file, the second file, and the third file may not be stored in a storage device (e.g., a flash memory, a secure digital (SD) card, or the like) of the electronic device 100A.

It may be impossible to execute or output the first file, stored in the memory of the electronic device 100A, through a document edition application. That is, the document edition application may not recognize existence of the first file in searching for an executable data file. For this reason, the document edition application may not execute the first file or may not provide a preview of the first file.

Furthermore, the second and third files respectively transmitted to the electronic devices 300B and 400C may be stored in memories of the electronic devices 300B and 400C, respectively. Like the first file, it may be impossible for the electronic devices 300B and 400C to output the second and third files through the document edition application, respectively.

Since each of the electronic devices 100A, 300B, and 400B stores only a corresponding split file, it may not edit or read a part or all of data before splitting. For example, even though the user B leaks a file of the work project maliciously, a document data file before splitting may not be leaked because only the split second file of the document data file is stored in the electronic device 300B of the user B.

Meanwhile, the users A, B, and C may again start the work project relating to the document data file. If the user A drives a document read/edition application using the electronic device 100A, first, the electronic device 100A may determine whether a connection with the electronic devices 300B and 400C is established. If the connection with the electronic devices 300B and 400C is determined as being established, the electronic device 100A may transmit a message, requesting the second file, to the electronic device 300B and a message, requesting the third file, to the electronic device 400C.

If the second file and the third file are respectively received from the electronic device 300B and the electronic device 400C in response to the messages, the electronic device 100A may restore data based on the first file, stored in the memory, and the second and third files. The above-described operations of the electronic device 100A may be performed on the electronic devices 300B and 400C in the same manner as above described. Accordingly, the user may obtain the restored document data file and may again perform the work project through the document edition application. The split files may be transmitted to a specific electronic device (e.g., an electronic device in which a file with the largest capacity is stored), and other electronic devices may connect to the specific electronic device and may participate in a work project. For example, the electronic device 100A may obtain the second and third files from the electronic device 300B and 400C respectively, and the electronic devices 300B and 400C may connect to the electronic device 100A in a cloud-computing manner and may work on the work project.

Figure 2:
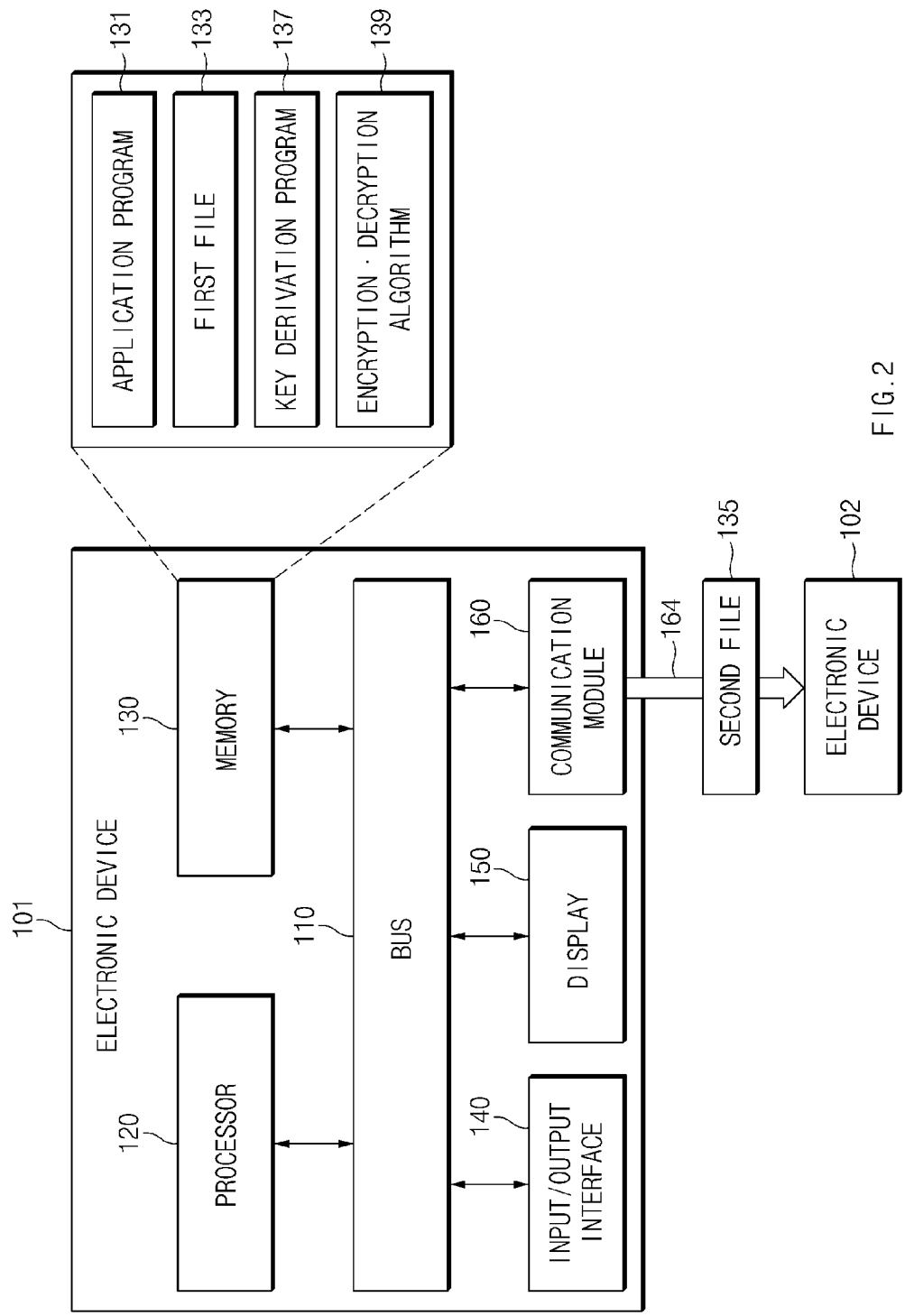
FIG. 2 is a diagram illustrating an electronic device, according to an embodiment of the present disclosure.

FIG. 2 is a diagram illustrating an electronic device 101, according to an embodiment of the present disclosure.

Referring to FIG. 2, the electronic device 101 may correspond to the electronic device 100A, 200A, 300B, or 400C illustrated in FIGS. 1A and 1C.

The electronic device 101 includes a bus 110, a processor 120, a memory 130, an input/output interface 140, a display 150, and a communication module 160. The electronic device 101 may include at least one of the above-described components or may further include other component(s), or at least one of the aforementioned components may be omitted from the electronic device 101.

The bus 110 may interconnect the above-described components 110-160 and may be a circuit for conveying communications (e.g., a control message and/or data) among the above-described components.

The processor 120 may drive an application program (hereinafter referred to as an "application") stored in the memory 130 and may execute data through the application. The data may include various data (files) regardless of formats. For example, the data may include document data, image data, video data, voice data, log data, and the like.

The processor 120 may generate a first file 133 and a second file 135 by splitting/dividing the data. The processor 120 may store the first file in the memory 130 and may transmit the second file 135 to an external electronic device 102 through the communication module 160. The second file 135 may be stored in the external electronic device 102 (or a memory thereof).

The processor 120 may use a lossless compression splitting method in splitting the data into the first file 133 and the second file 135. Furthermore, the processor 120 may further apply, for example, an error correcting code, which is used to detect and correct an error in splitting and restoring data, to the first file 133 or the second file 135. To detect the file corruption and ensure stability, a hash or a hash-based message authentication code (HMAC) may be shared by electronic device 101 and the external electronic device 102.

It may be impossible to output the first file 133 through the application, and it may be impossible to output the second file 135 through an application included in the external electronic device 102.

According to an embodiment, in splitting the data, the processor 120 may determine a size of the first file 133 to be generated and a size of the second file 135 to be generated, based on a type of the electronic device 101 or the external electronic device 102. For example, if the external electronic device 102 is a wearable device (e.g., a smart watch, a smart band, or the like), the processor 120 may determine the size of the second file 135 to be smaller than the size of the first file 133. The reason is that a memory included in the wearable device is smaller in capacity than a memory of a device (e.g., a smartphone, a tablet PC, or the like) that is not a wearable device. If the size of the second file 135 is relatively small compared the size of the first file, data load of wireless communication 164 may be reduced, and thus a file may be transmitted quickly.

According to an embodiment, the processor 120 may encrypt the data and may split the encrypted data into the first file 133 and the second file 135. Alternatively, after the processor 120 splits the data into the first file 133 and the second file 135, the processor 120 may encrypt the first file 133 and the second file 135, respectively. The electronic device 101 may perform encryption using a given encryption algorithm 139. The given encryption algorithm 139 may correspond to an encryption algorithm which is based on a block cipher. The block cipher based encryption algorithm may use the advanced encryption standard (AES) encryption algorithm or may use the white-box AES encryption algorithm. In the case of performing encryption through an algorithm of AES 256 or more, an encryption mode may be set to AES/CBC/PKCSS padding.

For example, the processor 120 may apply a key derivation algorithm to a password and may generate an encryption key. The processor 120 may encrypt data using the generated encryption key and the encryption algorithm 139. The password may be obtained from the external electronic device 102 through the communication module 160 or may be inputted by a user through the display 150, which is equipped with a touch panel.

Figure 5A:
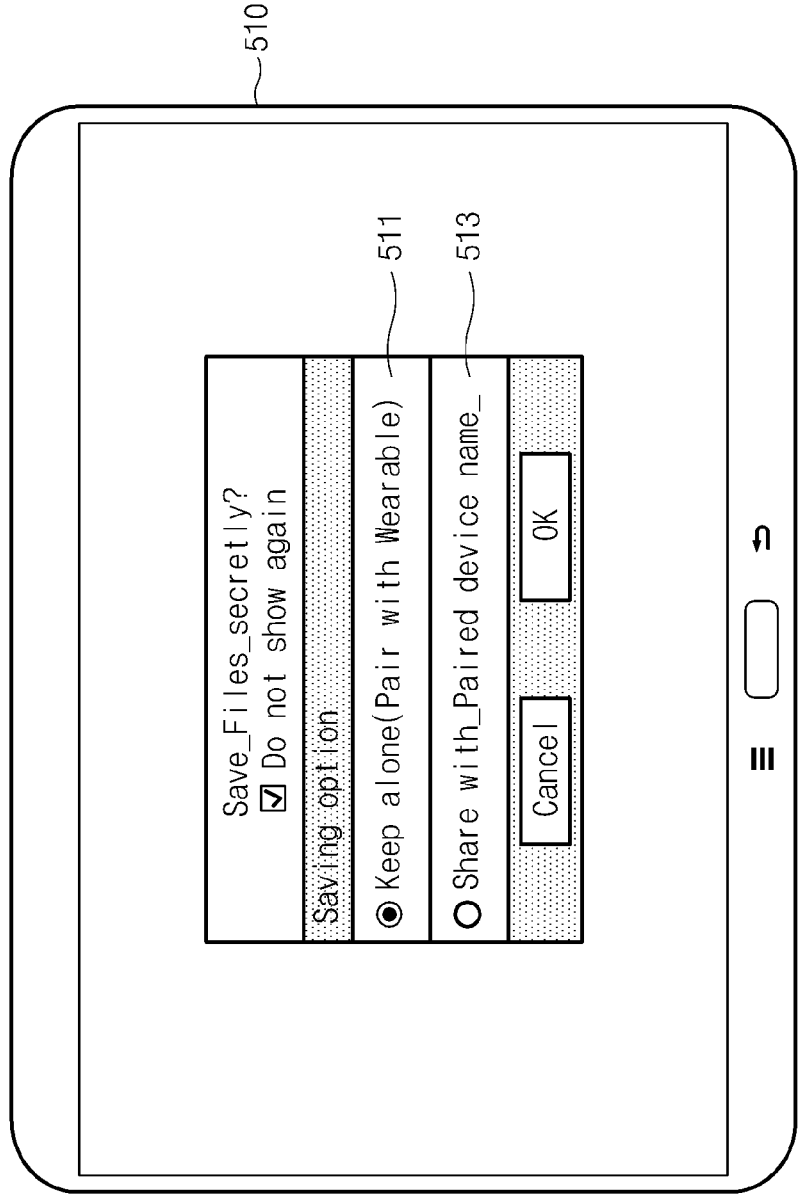
FIGS. 5A and 5B are diagrams illustrating a user interface (UI) for implementing a data managing method, according to an embodiment of the present disclosure.
Figure 5B:
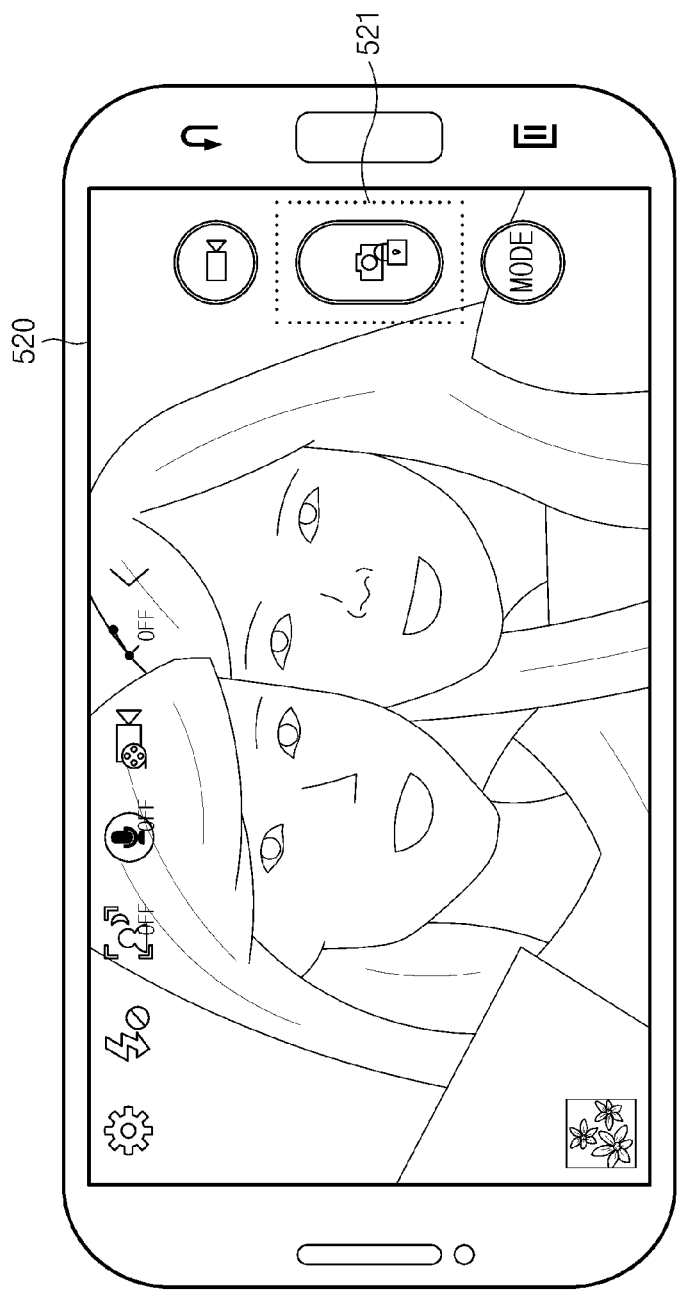

The processor 120 may perform the above-described encryption operation while obtaining the data (e.g., obtaining image data by selecting a camera shutter object in FIG. 5B). Alternatively, after obtaining the data, the processor 120 may perform the above-described encryption operation based on a selection of a user (e.g., a selection of choices 511 or 513 in FIG. 5A). Alternatively, the processor 120 may perform the above-described encryption operation with respect to previously obtained data at a specific time interval. In this case, the communication module 160 may ensure an encryption state of a file even though a connection with an external electronic device through the communication module 160 becomes deteriorated or is released.

According to an embodiment, if an the application is driven and a connection between the electronic device 101 and the external electronic device 102 is established, the processor 120 may determine whether the second file 135 corresponding to the first file 133 stored in the memory 130 (or whether the second file 135 exists) is obtained. For example, in the case where the second file 135 is not obtained from the external electronic device 102, the processor 120 may transmit a message, requesting that the second file 135 be transmitted to the electronic device 101, to the external electronic device 102 through the communication module 160.

If the second file 135 is received (or obtained) from the external electronic device 102 in response to the message, the processor 120 may restore data based on the first file 133 stored in the memory 130 and the second file 135 obtained from the external electronic device 102.

According to an embodiment, each of the first file 133 stored in the memory 130 and the second file 135 obtained from the external electronic device 102 may be an encrypted file. The processor 120 may restore data before splitting the data based on the encrypted first file 133 and the encrypted second file 135. Restoration of the data may be performed by using a decryption algorithm 139 stored in 130.

For example, the processor 120 may generate a decryption key by applying the key derivation algorithm 137 to a password obtained from the outside. The processor 120 may restore data from the first file 133 and the second file 135 using the generated decryption key and the decryption algorithm 139. The password may be obtained from the external electronic device 102 through the communication module 160 or may be obtained through the input/output interface 140.

As described above, in the case where a user of the electronic device 101 intends to use data before splitting, the processor 120 may establish a connection with the external electronic device 102 and may restore data based on the above-described method.

The processor 110 which performs the above-described function may include one or more of a central processing unit (CPU), an application processor (AP), or a communication processor (CP). For example, the processor 110 may perform an arithmetic operation or data processing associated with control and/or communication of at least other components.

The memory 130 may be coupled to the processor 120 through the bus 110 and may store software and/or a program. The memory 130 may include, for example, an application program (or an application) 131 capable of executing data, the first file 133 split from the data, the key derivation algorithm 137 generating the encryption key and the decryption key, and the encryption/decryption algorithm 139.

The I/O interface 140 may transmit an instruction or data, input from a user or another external device, to other component(s) of the electronic device 101. Furthermore, the I/O interface 250 may output an instruction or data, received from other component(s) of the electronic device 201, to a user or another external device.

The display 150 may display, for example, various contents (e.g., a text, an image, a video, an icon, a symbol, and the like) to a user. The display 150 may include a touch screen and may receive, for example, a touch input, a gesture input, a proximity input, or a hovering input using an electronic pen or a portion of a user's body. For example, the display 150 may receive a password from a user or may display (or output) data which the application 131 executes.

The communication module 160 may establish a communication connection between an external device (e.g., the external electronic device 102) and the electronic device 101 through the wireless communication 164. The wireless communication may include, for example, a local area network. For the local area network, the communication module 160 may include, for example, an interface module corresponding to at least one of Wi-Fi direct, Bluetooth, near field communication (NFC), a Bluetooth low energy (BLE), or an infrared-ray communication.

According to an embodiment, the wireless communication may include a cellular communication. The wireless communication may include at least one of, for example, long-term evolution (LTE), LTE-advanced (LTE-A), code division multiple access (CDMA), wideband CDMA (WCDMA), universal mobile telecommunications (UMTs), wireless broadband (WiBro), global system for mobile communication (GSM), or the like, as cellular communication protocol. According to an embodiment, the wireless communication 164 may be replaced with a wired communication. The wired communication may include at least one of, for example, a universal serial bus (USB), a high definition multimedia interface (HDMI), a recommended standard-232 (RS-232), or a plain old telephone service (POTS).

The external electronic device 102 may be a device which is different from or the same as the electronic device 101. All or a part of operations that the electronic device 101 will perform may be executed by another or plural electronic devices. In the case where the electronic device 101 executes any function or service automatically or in response to a request, the electronic device 101 may not perform the function or the service internally, but, alternatively/additionally, it may request at least a portion of a function associated with the electronic device 101 at other device (e.g., the external electronic device 102). The other electronic device (e.g., the external electronic device 102) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Below, for illustrative purposes, a data managing method is described as being performed between two electronic devices. However, the scope and spirit of the present disclosure may not be limited thereto. As illustrated in FIG. 1B, the data managing method according to various embodiments of the present disclosure may be applied with respect to three or more electronic devices.

Figure 3:
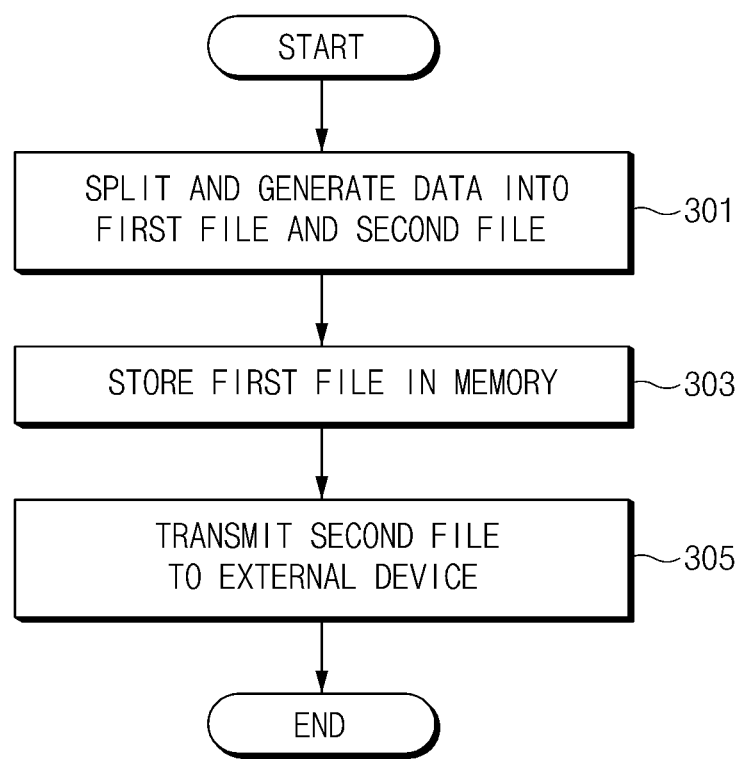
FIG. 3 is a flowchart illustrating a data managing method, according to an embodiment of the present disclosure.

FIG. 3 is a flowchart illustrating a data managing method, according to an embodiment of the present disclosure.

In operation 301, the processor 120 may generate the first file 133 and the second file 135 by splitting data executable by the application 131.

In operation 303, the processor 120 may store the first file 133 in the memory 130 of the electronic device 101. The first file 133 may be configured so as not to be outputted or executed by the application 131.

In operation 305, the processor 120 may transmit the second file 135 to the external electronic device 102 through the communication module 160 so that the second file can be stored in the external electronic device 102. After the second file is transmitted to the external electronic device 102, the second file 135 may not exist in the electronic device 101, i.e., the second file may be deleted from the electronic device 101.

Figure 4:
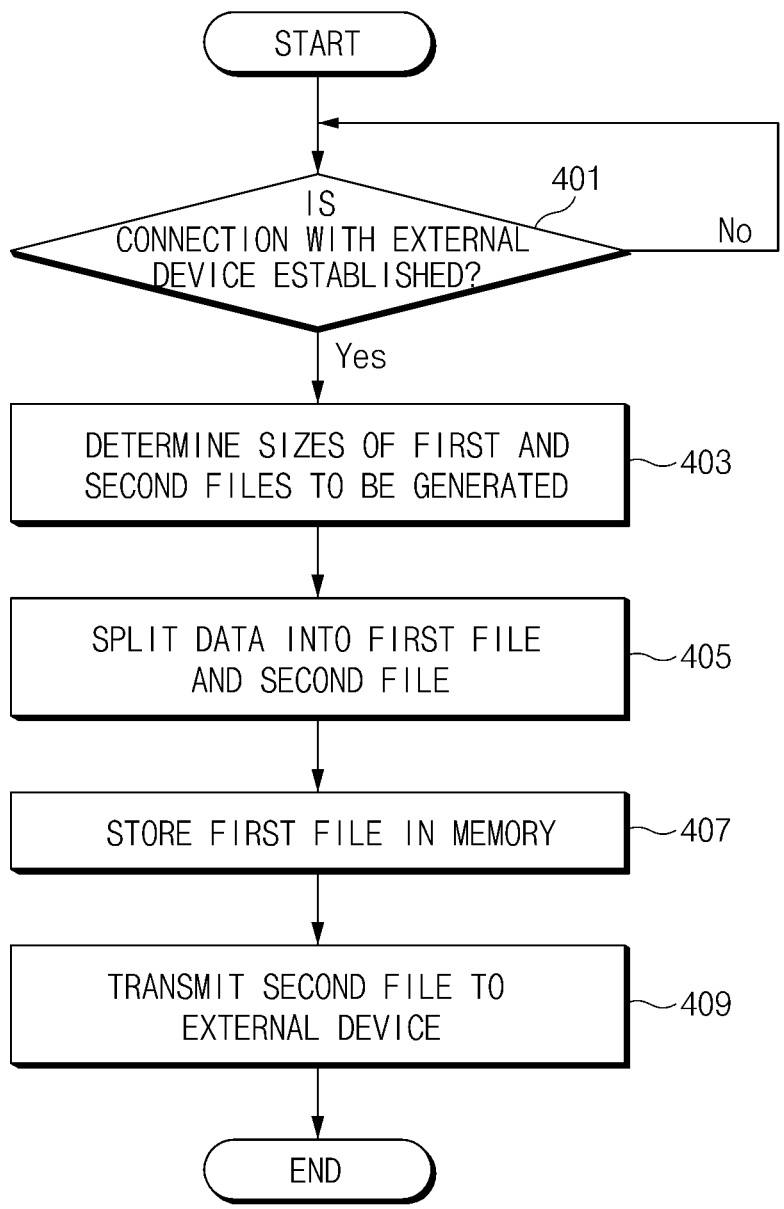
FIG. 4 is a flowchart illustrating a data managing method, according to an embodiment of the present disclosure.

FIG. 4 is a flowchart illustrating a data managing method, according to an embodiment of the present disclosure.

In operation 401, the processor 120 may determine whether a connection with the external electronic device 102 through the communication module 160 is established. If the communication with the external device 102 is established, the data managing method may proceed to operation 403; if not, the data managing method may proceed to operation 401 for iterative determination.

In operation 403, the processor 120 may determine a size (or a division ratio) of the first and second files 133 and 135 to be generated, based on a type of the electronic device 101 or the external electronic device 102. For example, the processor 120 may determine types (e.g., a model name, a device kind (e.g., a smartphone, a smart watch, a tablet PC, a laptop PC, or the like)) of electronic devices, a space of a storage device, a supportable communication manner (e.g., a cellular communication, Wi-Fi, a wired communication, or the like), based on a device profile stored in the memory 130 of the electronic device 101 and a device profile of the external electronic device 102 obtained in establishing the connection.

For example, if the external electronic device 102 is a wearable device, the processor 120 may determine the size of the second file 135 to be smaller than the size of the first file 133. Furthermore, in the case where the electronic device 101 is a laptop PC equipped with a mass memory, the size of the second file 135 may be determined to be smaller than the size of the first file 133. The sizes of the first file 133 and the second file 135 may comply with a setting of a user, but the size of the second file may be set to have a minimum size which makes it impossible to restore data based on only the first file 133 corresponding to the second file 135.

In operation 405, the processor 120 may generate the first file 133 and the second file 135 by splitting obtained data based on the file size determined in operation 403.

In operation 407, the processor 120 may store the first file 133 in the memory 130.

In operation 409, the processor 120 may transmit the second file 135 to the external electronic device 102 through the communication module 160. The second file 135 may be stored in a memory of or a memory connectable to the external electronic device 102.

FIGS. 5A and 5B are diagrams illustrating a user interface (UI) for implementing a data managing method, according to an embodiment of the present disclosure.

Referring to FIG. 5A, there is illustrated a tablet PC 510 in which the electronic device 101 is included. For example, a user of the tablet PC 510 may perform work relating to a document data file solely or in collaboration with any other user(s), using the document edition application. If the work is completed, the user of the tablet PC 510 may perform a user manipulation (e.g., a selection of a "secret save" button) to store the completed document data file. If the user manipulation is performed, a screen illustrated in FIG. 5A may appear on the display 150.

Figure 6:
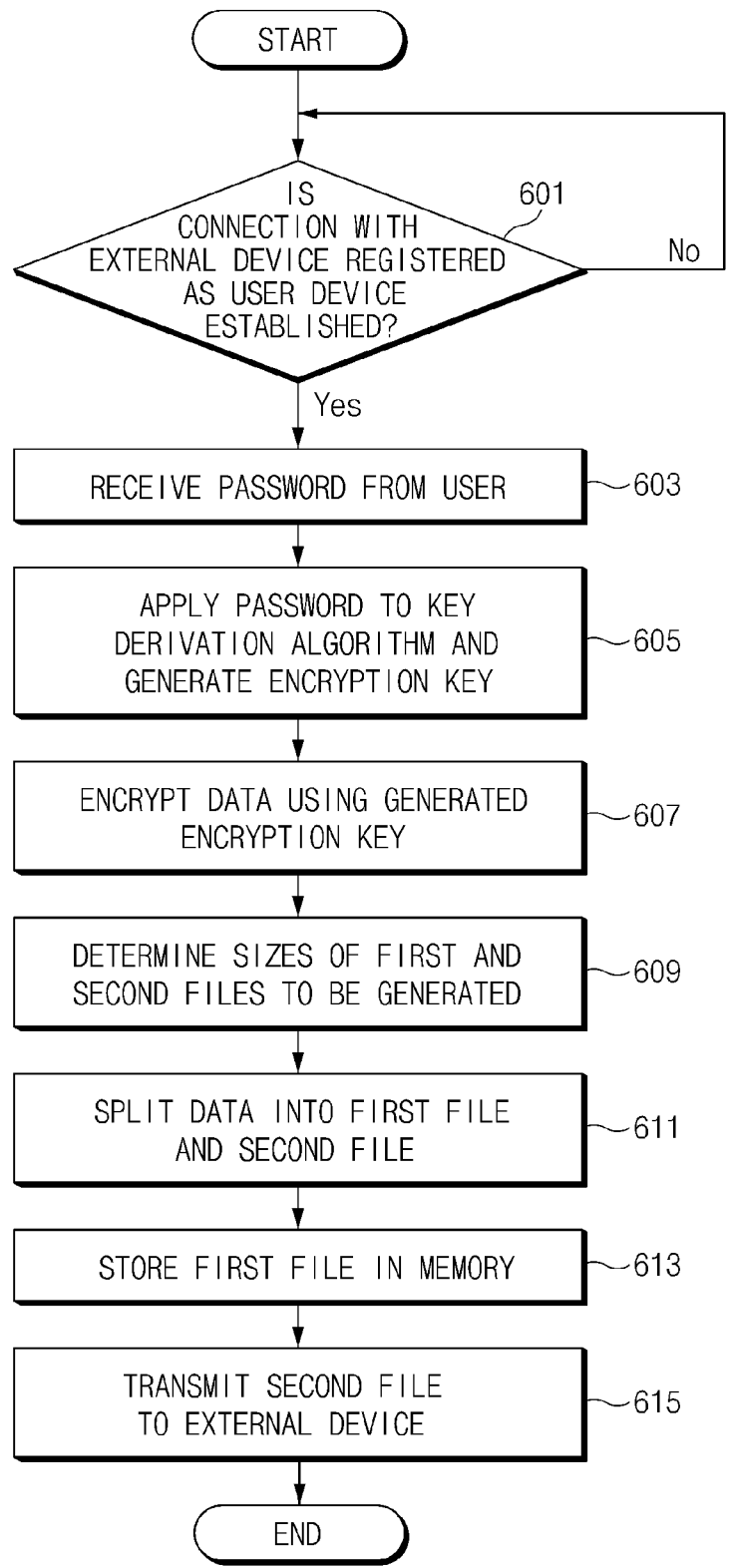
FIG. 6 is a flowchart of a data managing method, as applied to electronic devices belonging to the same user, according to an embodiment of the present disclosure.
Figure 7:
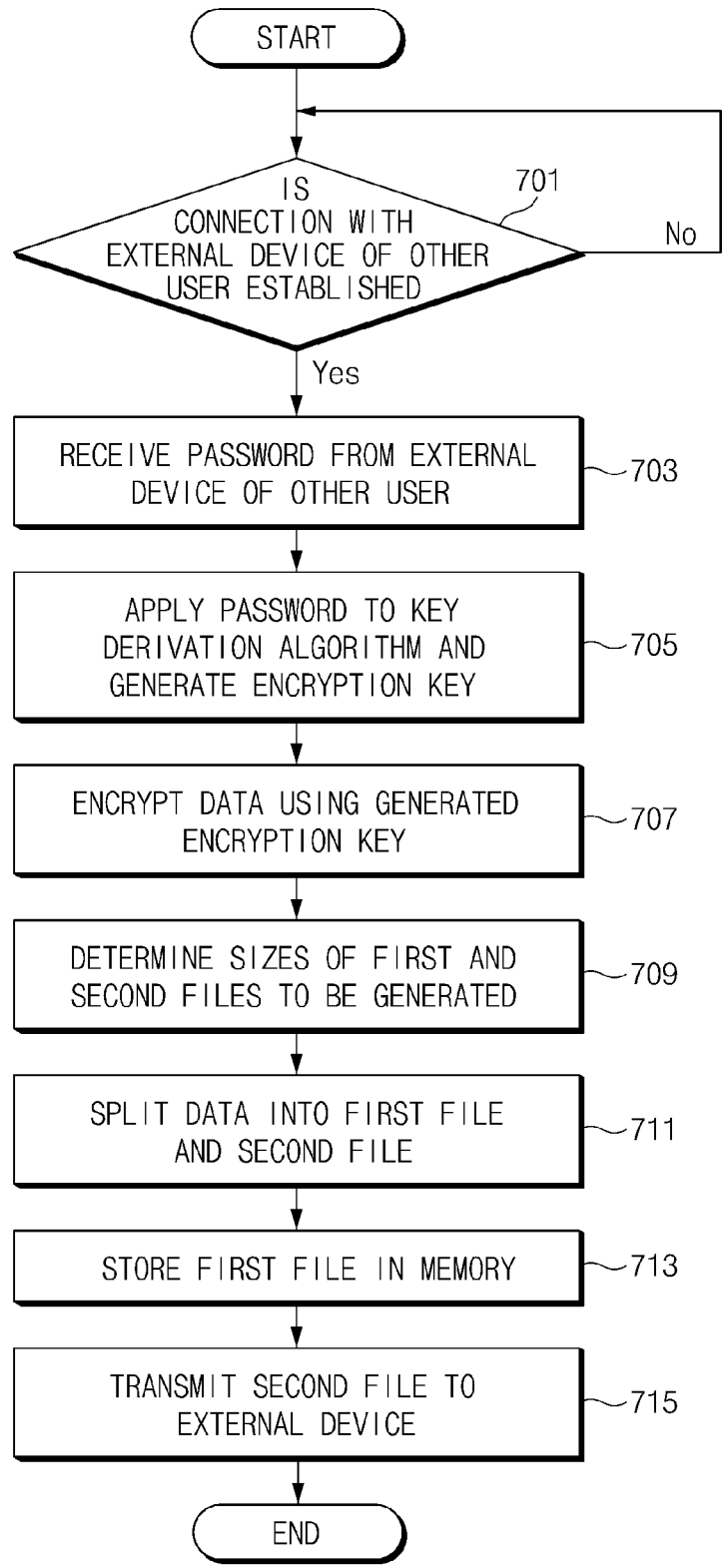
FIG. 7 is a flowchart of a data managing method, as applied to electronic devices belonging to different users, according to an embodiment of the present disclosure.

For example, if the user of the tablet PC 510 selects the choice 511, a data managing method to be described with respect to FIG. 6 may be performed, or if the user selects the choice 513, a data managing method to be described with respect to FIG. 7 may be performed.

Referring to FIG. 5B, there is illustrated a smartphone 520. The smartphone 520 may include an imaging sensor (a camera) and may correspond to the electronic device 101. A user of the smartphone 520 may obtain image data using a camera application. For example, image data may be obtained if the user of the smartphone 520 selects (or touches) an object 521 indicating a camera shutter. For example, the data managing method illustrated in FIG. 6 may be performed if the image data is obtained. Meanwhile, the camera application may provide an icon implying that the above-described secure manner is applied to an image being currently captured. For example, a lock-shaped indication may be included in the object 521 indicating the camera shutter. For example, the object 521 may be able to imply that a communication connection with the external electronic device 102 is established and that an image captured through the touch of the object 521 is split and stored in the smartphone 520 and the external electronic device 102.

FIG. 6 is a flowchart illustrating a data managing method, which is applied to electronic devices belonging to the same user, according to an embodiment of the present disclosure.

Referring to FIG. 6, Operation 601 -operation 615 may be executed, for example, in the case where a user selects the choices 511 of FIG. 5A or selects a camera shutter object 521 of FIG. 5B. In the case where the choice 511 of FIG. 5A is selected, the split data may be a document data file, and in the case where the camera shutter object 521 of FIG. 5B is selected, the split data may be image data.

In operation 601, the processor 120 may determine whether a connection with the external electronic device 102 is established. For example, the processor 120 may determine whether the external electronic device 102 connected with the electronic device 101 is registered as a device belonging to a user of the electronic device 101. For example, if the user of the external electronic device 102 is the same as the user of the electronic device 101, the data managing method may proceed to operation 603; if not, the data managing method may proceed to operation 601 for iterative determination.

In operation 603, the electronic device 101 may obtain a password from a user through the display 150 equipped with a touch panel. For example the password may be inputted through the external electronic device 102 belonging to the same user. The electronic device 101 may receive the password from the external electronic device 102. Since the electronic device 101 and the external electronic device 102 both belong to the same user, the user may input the password through the electronic device 101 or the external electronic device 102) which the user randomly selects.

In operation 605, the processor 120 may apply the key derivation algorithm 137 to the password obtained in operation 603 and may generate an encryption key.

In operation 607, the processor 120 may encrypt the previously obtained data (e.g., a document data file or image data) using the encryption key generated in operation 605 and the encryption algorithm 139.

According to an embodiment, the data may be encrypted after the data is split. In other words, data encryption may be performed with respect to each of the split first file 133 and the split second file 135. That is, operations 609-611 may be performed first, and operation 603-607 may be performed after operation 611. In this case, in operation 613 and operation 615, the first file 133 and the second file 135 may be files which are encrypted after splitting the data.

In operation 609, the processor 120 may determine a size of the first file 133 to be generated from the data and a size of the second file 135 to be generated from the data, based on a type of the electronic device 101 or the external electronic device 102. If the external electronic device 102 is determined according to a profile of the external electronic device 102 as being a wearable device, the processor 120 may determine the size of the second file 135 to be smaller than the size of the first file 133.

In operation 611, the processor 120 may split the obtained data based on the size of each file determined in operation 609 and may generate the first file 133 and the second file 135.

In operation 613, the processor 120 may store the first file 133 in the memory 130.

In operation 615, the processor 120 may transmit the second file 135 to the external electronic device 102 so that the second file can be stored in the external electronic device 102.

FIG. 7 is a flowchart illustrating a data managing method, which is applied to electronic devices belonging to different users, according to an embodiment of the present disclosure. Below, a description of the operations of FIG. 7 that are the same as the operations of FIG. 6 are omitted.

Referring to FIG. 7, operations 701-715 may be executed, for example, in the case where a user selects choice 511 of FIG. 5A. In the case where the choice 511 of FIG. 5A is selected, data to be split may be a document data file which is created in collaboration with a plurality of users.

In operation 701, the processor 120 may determine whether a connection with the external electronic device 102 through the communication module 160 is established. That is, the processor 120 may determine whether the external electronic device 102 connected with the electronic device 101 is registered as a member. For example, if the external electronic device 102 is registered as a member, the data managing method may proceed to operation 703; if not, the data managing method may proceed to operation 701 for iterative determination.

In operation 703, the processor 120 may receive a password, which any other member inputs using the external electronic device 102, from the external electronic device 102. Alternatively, the other member may input a password using the electronic device 101 instead of the external electronic device 102.

In operation 705, the processor 120 may apply the key derivation algorithm 137 to the password obtained in operation 703 and may generate an encryption key.

In operation 707, the processor 120 may encrypt the obtained data using the encryption key generated in operation 705 and the encryption algorithm 139 stored in the memory 130.

In operation 709, the processor 120 may determine a size of the first file 133 to be generated from the data and a size of the second file 135 to be generated from the data, based on a type of the electronic device 101 or the external electronic device 102.

In operation 711, the processor 120 may split the data based on the size of each file determined in operation 709 and may generate the first file 133 and the second file 135.

In operation 713, the processor 120 may store the first file 133 in the memory 130.

In operation 715, the processor 120 may transmit the second file 135 to the external electronic device 102 so that the second file can be stored in the external electronic device 102.

Figure 8:
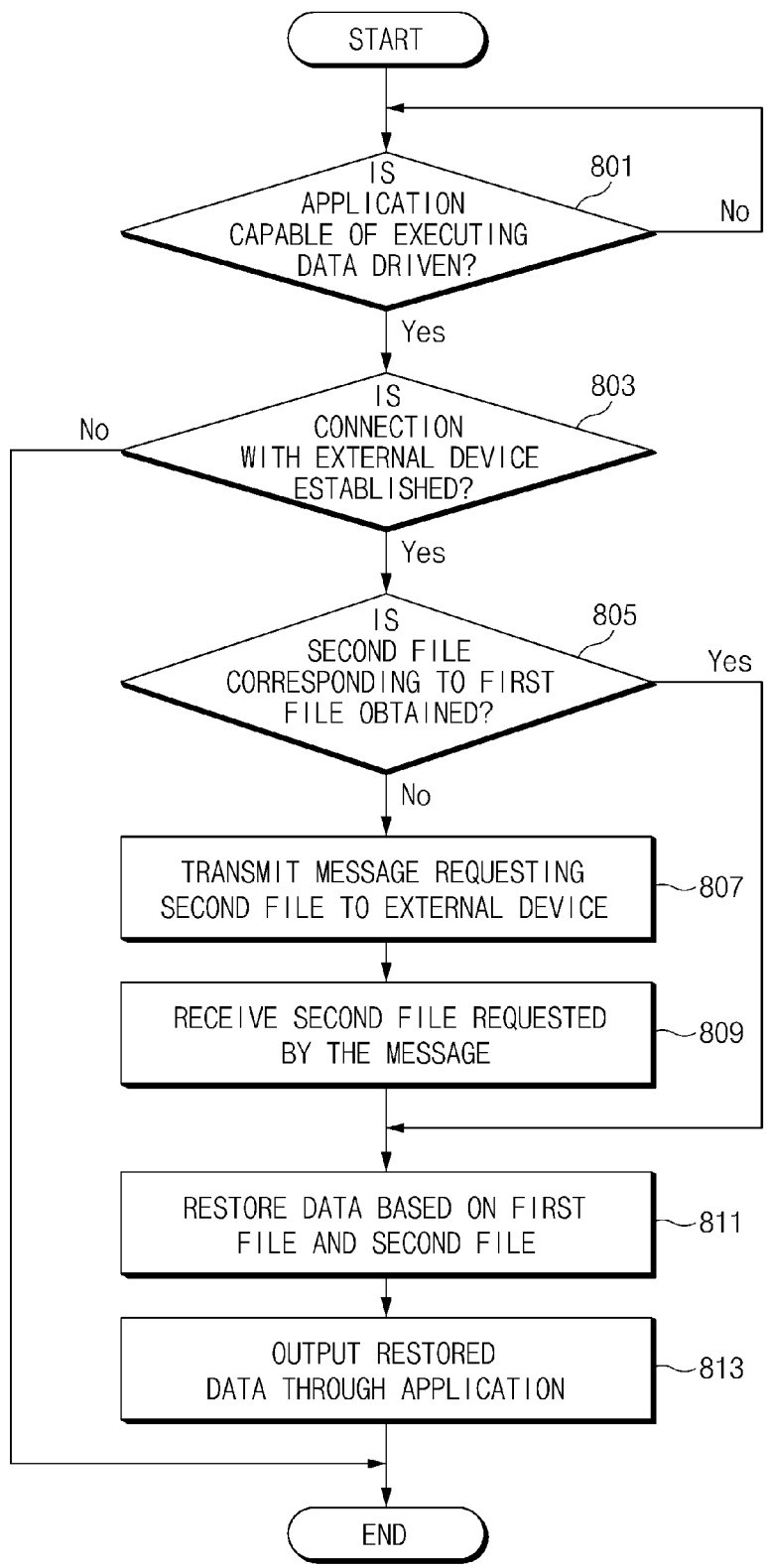
FIG. 8 is a flowchart of a data managing method for restoration of data, according to an embodiment of the present disclosure.

FIG. 8 is a flowchart illustrating a data managing method for restoration of data, according to an embodiment of the present disclosure.

Referring to FIG. 8, operations 801-813 may be performed, for example, after each operation of FIG. 3 or 4 is performed.

In operation 801, the processor 120 may determine whether the application 131 capable of executing (e.g., reading, editing, or the like) data is driven. If the determination result indicates that the application 131 is driven, the data managing method may proceed to operation 803; if not, the data managing method may proceed to operation 801 for iterative determination.

In operation 803, the processor 120 may determine whether a connection with the external electronic device 102 through the communication module 160 is established. If the determination result indicates that the connection with the external electronic device 102 through the communication module 160 is established, the data managing method may proceed to operation 805, and if not, the data managing method may be ended. According to an embodiment, if the connection with the external electronic device 102 is not established, the electronic device 101 may iteratively make an attempt at a connection with the external electronic device 102.

In operation 805, the processor 120 may determine whether the second file 135 corresponding to the first file 133 is stored in the memory 130. For example, operation 805 may be performed when the application 131 searches for executable data. In the case where the second file 135 corresponding to the first file 133 is stored in the memory 130, the data managing method may proceed to operation 811; if not, the data managing method may proceed to operation 807.

In the case where the second file 135 corresponding to the first file 133 is not stored in the memory 130, in operation 807, the processor 120 may transmit a message, requesting that the second file 135 be transmitted to the electronic device 101, to the external electronic device 102.

In operation 809, the processor 120 may obtain from the external electronic device 102 the second file 135 corresponding to the message, transmitted in operation 807, through the communication module 160.

In operation 811, the processor 120 may restore data based on the first file 133 and the second file 135.

In operation 813, the processor 120 may output the restored data through an application. A user of the electronic device 101 may read or edit the restored data with the application.

Figure 9:
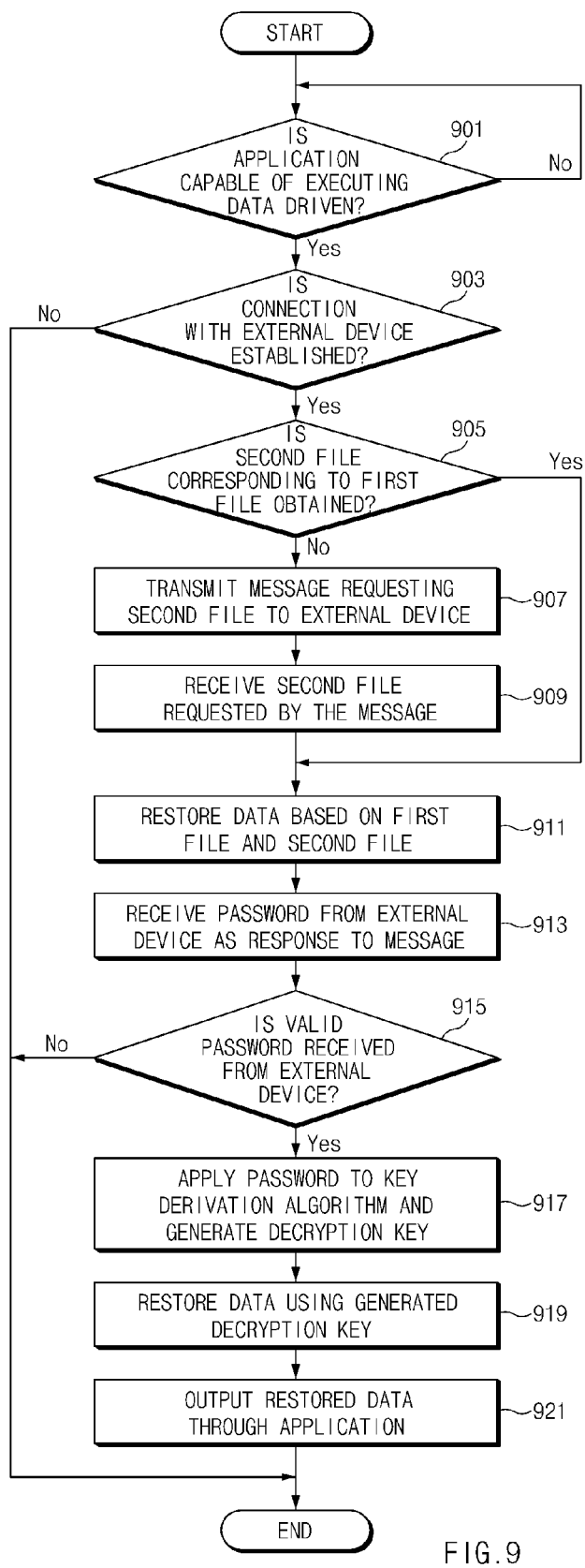
FIG. 9 is a flowchart illustrating a data managing method for restoration of data, according to an embodiment of the present disclosure.

FIG. 9 is a flowchart illustrating a data managing method for restoration of data, according to an embodiment of the present disclosure. In FIG. 9, a description of the operations that are the same as the steps of FIG. 8 is omitted.

Referring to FIG. 9, Operations 901-921 may be performed, for example, after each of the operations of FIGS. 6 and 7 is performed. Below, it may be assumed that the external electronic device 102 stores the second file 135 and the second file 135 is previously encrypted.

In operation 901, the processor 120 may determine whether the application 131 is driven. If the determination result indicates that the application 131 is driven, the data managing method may proceed to operation 903; if not, the data managing method may proceed to operation 901 for iterative determination.

In operation 903, the processor 120 may determine whether a connection with the external electronic device 102 through the communication module 160 is established. If the determination result indicates that the connection with the external electronic device 102 is established, the data managing method may proceed to operation 905; if not, the data managing method may be ended.

In operation 905, the processor 120 may determine whether the second file 135 corresponding to the first file 133 is stored in the memory 130. For example, operation 905 may be performed when the application 131 searches for executable data.

For example, in the case where the application 131 is an image viewer application, the image viewer application may search for and display displayable images (e.g., jpeg, gif, and png images). For example, the image viewer application may confirm existence of the first file 133 and may determine whether the second file 135 corresponding to the first file 133 is stored in the memory 130. For example, information (e.g., a file name, an identification of an external device in which the second file 135 is stored, and the like) about the second file 135 may be included in a header, a reserved field, and the like of the first file 133. The processor 120 may determine whether a corresponding file is stored in the memory 130, based on information relating to the second file 135. In the case where the second file 135 corresponding to the first file 133 is stored in the memory 130, the data managing method may proceed to operation 911; if not, the data managing method may proceed to operation 907.

In the case where the second file 135 corresponding to first file 133 is not stored in the memory 130, in operation 907, the processor 120 may transmit a message, requesting that the second file 135 be transmitted to the electronic device 101, to the external electronic device 102.

In operation 909, the processor 120 may receive and obtain from the external electronic device 102 the second file 135 corresponding to the message, transmitted in operation 907, through the communication module 160.

In operation 911, the processor 120 may transmit a message, requesting a password to the external electronic device 102 through the communication module 160.

In operation 913, the processor 120 may obtain a password from the external electronic device 102 through the communication module 160 in response to the message transmitted in operation 911. Alternatively, the password may be directly obtained from a user of the external electronic device 102 through the display 150 equipped with a touch panel.

In operation 915, the processor 120 may determine whether the password obtained from the external electronic device 102 is valid. If the determination result indicates that the obtained password is valid, the data managing method may proceed to operation 917; if not, the data managing method may be ended.

In operation 917, the processor 120 may apply the key derivation algorithm 137 to the password obtained in operation 913 and may generate a decryption key.

In operation 919, the processor 120 may restore data based on the first file 133 stored in the memory 130 and the second file 135 obtained from the external electronic device 102, using the decryption key generated in operation 917 and the decryption algorithm.

In operation 921, the processor 120 may execute or output the restored data using an application.

FIGS. 10A-10D are diagrams illustrating a screen to which a data managing method is applied, according to various embodiments of the present disclosure.

Figure 10A:
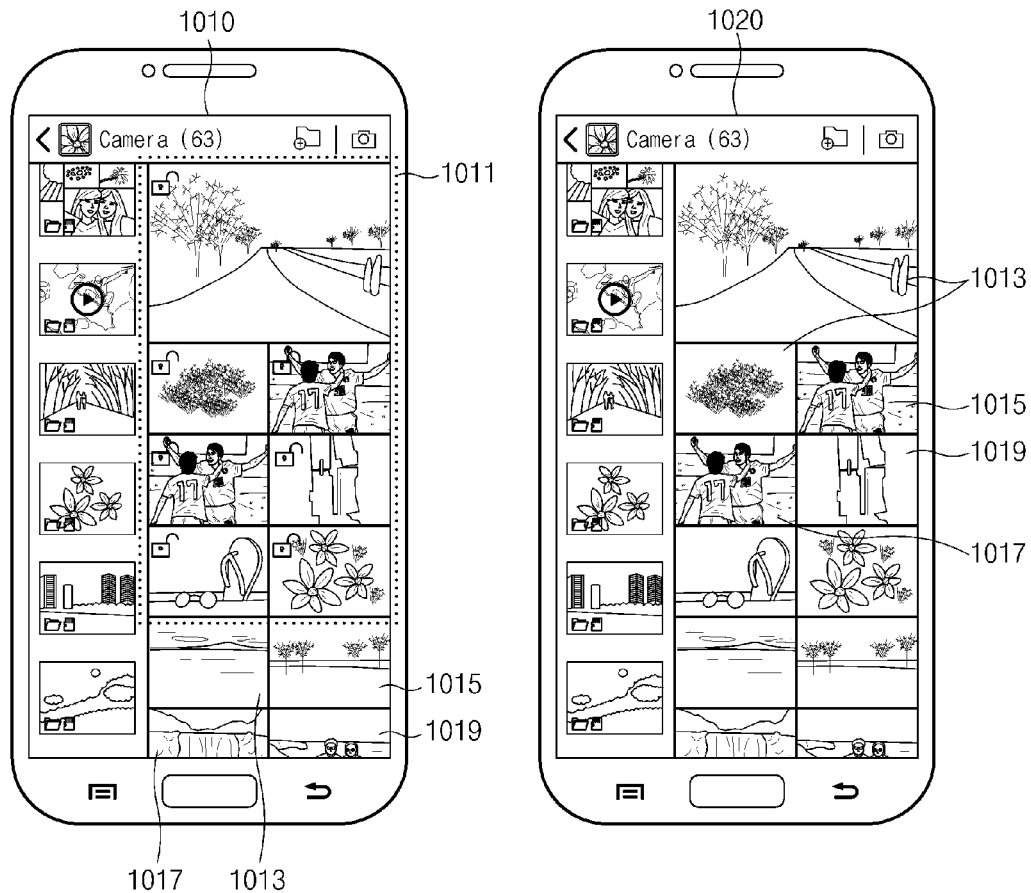
FIGS. 10A-10D are diagrams illustrating a screen to which a data managing method is applied, according to an embodiment of the present disclosure.

In FIG. 10A, screens 1010 and 1020 corresponding to the case that split or restored data is image data are shown.

In the screen 1010, a plurality of image data 1011 and a plurality of image data including image data 1013-1019 may be outputted by an image viewer application. The plurality of images 1011 may refer to image data restored according to a data managing method illustrated in FIG. 8 or 9. That is, each of the images 1011 may refer to an image restored from a first file stored in the memory 130 and a second file received from the external electronic device 102. A user may easily understand that each of the images 1011 is a restored image, through an unlocked indication.

In contrast, the screen 1020 may appear in the case where data restoration by the methods of FIG. 8 or 9 is not made (e.g., "No" in operation 803 of FIG. 8, or "No" in operation 903 or operation 915 of FIG. 9). In the screen 1020, a plurality of image data including image data 1013, 1015, 1017, and 1019 may be outputted by the image viewer application. Since image data 1013, 1015, 1017, and 1019 is stored according to a general method, the image data 1013, 1015, 1017, and 1019 may be displayed in common on the screens 1010 and 1020. However, since the images 1011 are not restored, due to absence of the second file corresponding to each of the images 1011, the images 1011 may not be displayed on the screen 1020.

Figure 10B:
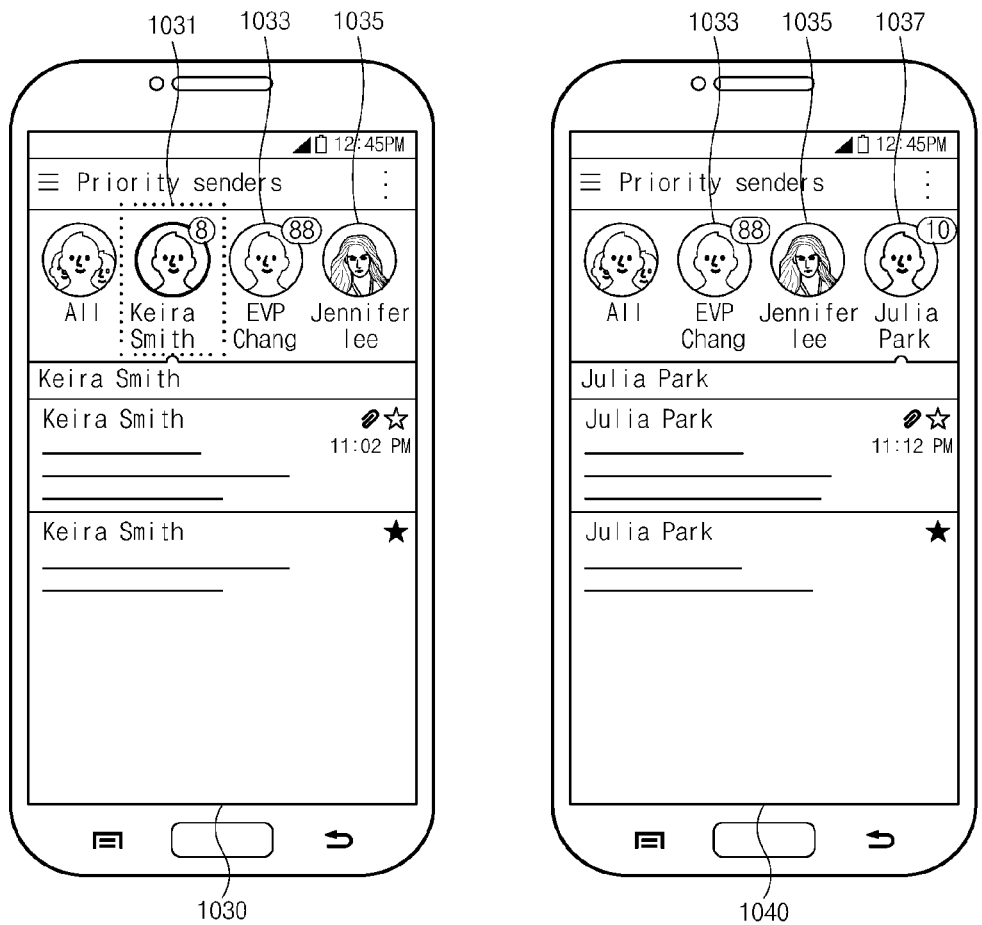

In FIG. 10B, screens 1030 and 1040 corresponding to the case that split or restored data is communication history data are shown.

In the screen 1030, receipt history data (or communication history data) 1031, 1033, and 1035 corresponding to contacts may be outputted by a messaging application. The receipt history data 1031 from "Keira Smith" may refer to image data restored according to a data managing method illustrated in FIG. 8 or 9. That is, the receipt history data 1031 may refer to receipt history data which is restored from a first file stored in the memory 130 and a second file received from the external electronic device 102.

In contrast, the screen 1040 may appear in the case where data restoration by FIG. 8 or 9 is not made (e.g., "No" in operation 803 of FIG. 8, or "No" in operation 903 or operation 915 of FIG. 9). In the screen 1040, receipt history data 1031, 1035, and 1037 corresponding to contacts may be outputted by the messaging application. Since being general receipt history data to which various embodiments of the present disclosure are not applied, the receipt history data 1031, 1035, and 1037 may be displayed in common on the screens 1030 and 1040. However, the receipt history data 1031 from "Keira Smith" may not be displayed on the screen 1040 due to absence of a second file corresponding thereto.

Figure 10C:
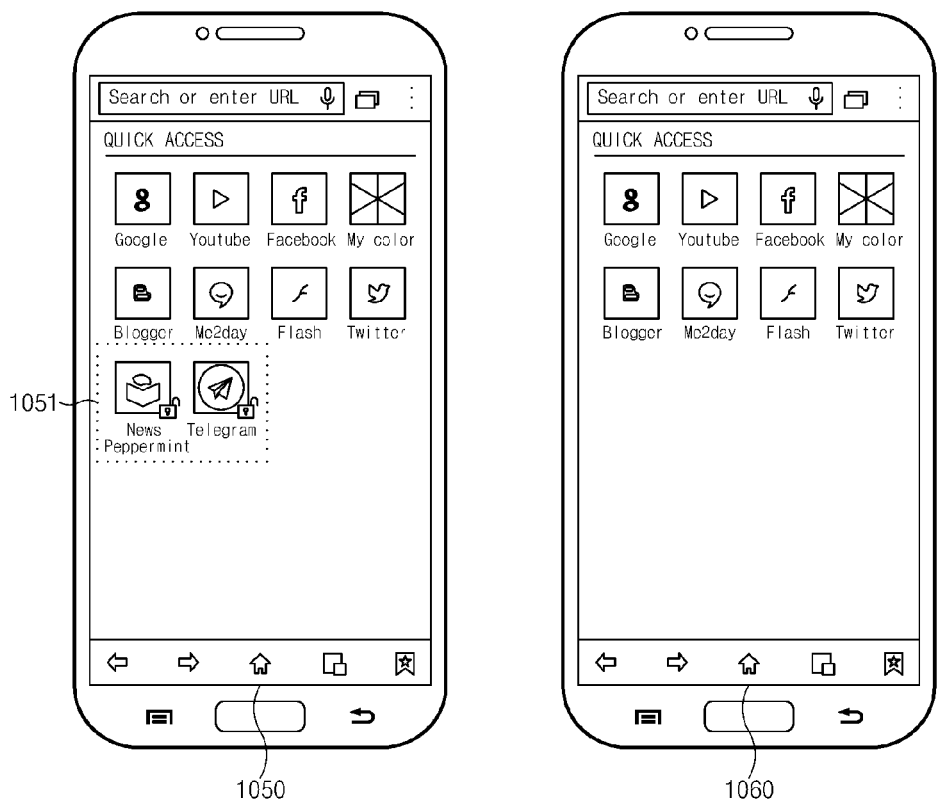

In FIG. 10C, screens 1050 and 1060 corresponding to the case where split or restored data is web page address data (e.g., a HTML file including URL) are shown.

In the screen 1050, a plurality of web page address data including two pieces of web page address data (e.g., web page address data of "News Peppermint" and "Telegram") 1051 may be outputted by a web browser application. Each of the two pieces of the web page address data 1051 may refer to web page address data restored according to a data managing method illustrated in FIG. 8 or 9. That is, each of the two pieces of the web page address data 1051 may refer to web page address data which is restored from a first file stored in the memory 130 and a second file received from the external electronic device 102.

In contrast, the screen 1060 may appear in the case where data restoration by FIG. 8 or 9 is not made (e.g., "No" in operation 803 of FIG. 8, or "No" in operation 903 or operation 915 of FIG. 9). However, since the web page address data 1051 is not restored, due to absence of a second file corresponding to the web page address data 1051, the web page address data 1051 may not be outputted on the screen 1060.

Figure 10D:
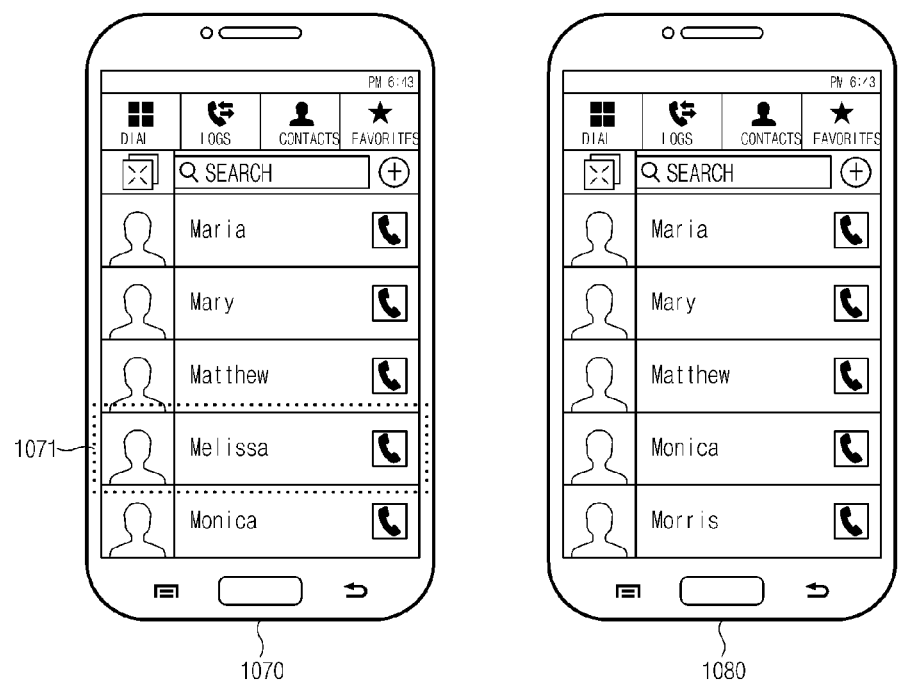

In FIG. 10D, screens 1070 and 1080 corresponding to the case that split or restored data is contact data are shown.

In the screen 1070, a plurality of address book data (or contact data) including contact data 1071 of "Melissa" may be outputted by a contact application. The contact data 1071 of "Melissa" may correspond to contact data restored according to a data managing method illustrated in FIG. 8 or 9. That is, the contact data 1071 of "Melissa" may refer to contact data which is restored from a first file stored in the memory 130 and a second file received from the external electronic device 102.

In contrast, the screen 1080 may appear in the case where data restoration by FIG. 8 or 9 is not made (e.g., "No" in operation 803 of FIG. 8, or "No" in operation 903 or operation 915 of FIG. 9). However, the contact data 1071 of "Melissa" may not be outputted on the screen 1060, due to absence of a second file corresponding thereto.

In accordance with the instant disclosure, data, which is intended to be secure, may be split, and the split data may be respectively stored in a plurality of electronic devices. Thus, it may be impossible to restore data only using a split file stored in each of the electronic devices. This may mean that data necessary for protection of privacy or the secure measures is safely managed.

Furthermore, the sizes of first and second files to be split may be determined according to a type of each electronic device. In particular, in the case where a wearable device is used as an external electronic device, the size of the second file to be transmitted to the wearable device may be made small, thereby reducing data throughput and making the use of a memory in the wearable device efficient.

In addition, if the data managing method is applied to electronic devices belonging to the same user, even though one of the electronic devices is lost, a user picking up the lost electronic device may not read or spread a file before splitting because only a split file is stored in each electronic device.

Furthermore, since data encryption is able to be additionally used, even though all the electronic devices are lost, a user picking up the electronic device by chance may not read or spread a file before splitting.

If the data managing method is applied to electronic devices belonging to different users, to read or spread a file before splitting may be impossible as far as electronic devices of all users are not connected to each other.

Data to be split may include data files of various formats. With the above description, the data managing method may be applied to various fields necessary for protection of privacy or secure measure.

At least a portion of an apparatus (e.g., modules or functions thereof) or a method (e.g., operations) according to various embodiments of the present disclosure may be, for example, implemented by instructions stored in a non-transitory computer-readable storage media in the form of a program module. The instruction, when executed by one or more processors (e.g., a processor 120), may cause the one or more processors to perform a function corresponding to the instruction. A non-transitory computer-readable storage medium may be, for example, the memory 130.

A non-transitory computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

According to various embodiments of the present disclosure, data may be split, and the split data may be respectively stored in a plurality of electronic devices. Thus, it may be impossible to restore data with only a file stored in each electronic device. This may mean that key data is safely managed.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory configured to store at least one application;
a communication module configured to establish a connection between the electronic device and an external electronic device configured to execute the at least one application in response to a user input; and
a processor configured to:
execute the at least one application,
split data executable by the at least one application into a first file and a second file, wherein a size of the first file and a size of the second file are based on a type of the electronic device or the external electronic device,
store the first file in the memory, and
transmit the second file to the external electronic device through the communication module for storing the second file in the external electronic device.

2. The electronic device of claim 1, wherein the first file is configured not to be executable by the at least one application.

3. The electronic device of claim 1, wherein if the external electronic device is a wearable device, the processor is further configured to determine if the size of the second file is smaller than the size of the first file.

4. The electronic device of claim 1, wherein the memory is further configured to store a key derivation algorithm, which is configured to generate an encryption key, and
wherein the processor is further configured to set a password, which is received from the external device, to the key derivation algorithm to generate the encryption key and encrypt data in the first file using the encryption key.

5. The electronic device of claim 4, wherein the password is obtained from the external electronic device.

6. The electronic device of claim 4, wherein the password is inputted by a user of the electronic device.

7. The electronic device of claim 4, wherein the processor is further configured to perform encryption based on a block cipher.

8. The electronic device of claim 1, wherein the memory is further configured to store a key derivation algorithm, which is configured to generate an encryption key for encrypting data in the first file, and
wherein the processor is further configured to set a password, which is received from the external device, to the key derivation algorithm to generate the encryption key and encrypt the first file and the second file using the encryption key.

9. The electronic device of claim 1, wherein if the at least one application is executed and the connection between the electronic device and the external electronic device is established, the processor is further configured to determine whether the second file corresponding to the stored first file is received at the electronic device from the external electronic device, and
wherein if it is determined that the second file is not received at the electronic device from the external electronic device, the processor is further configured to transmit a message, requesting that the second file be transmitted to the electronic device, to the external electronic device through the communication module.

10. The electronic device of claim 9, wherein the processor is further configured to restore the data from the first file and the second file when the second file is received from the external electronic device in response to the message.

11. The electronic device of claim 1, wherein the communication module establishes the connection with the external electronic device through a wireless local area network.

12. A data managing method of an electronic device, the method comprising:
splitting data executable by at least one application into a first file and a second file, wherein a size of the first file and a size of the second file are based on a type of the electronic device or an external electronic device;
storing the first file in a memory of the electronic device; and
transmitting the second file to the external electronic device configured to execute the at least one application in response to a user input, for storing the second file in the external electronic device.

13. The method of claim 12, wherein determining the size of the first and second files comprises
if the external electronic device is a wearable device, determining if the size of the second file is smaller than the size of the first file.

14. The method of claim 12, further comprising:
obtaining a password;
setting the password to a key derivation algorithm and generating an encryption key; and
encrypting the data using the generated encryption key.

15. The method of claim 14, wherein obtaining the password comprises:
receiving the password from the external electronic device.

16. The method of claim 14, wherein obtaining the password comprises:
receiving the password from a user of the electronic device.

17. The method of claim 12, further comprising:
if the at least one application is executed and the connection between the electronic device and the external electronic device is established, determining whether the second file corresponding to the stored first file is received at the electronic device from the external electronic device, and
if it is determined that the second file is not received at the electronic device from the external electronic device, transmitting a message, requesting that the second file be transmitted to the electronic device, to the external electronic device.

18. The method of claim 17, further comprising:
receiving the second file from the external device in response to the message; and
restoring the data from the stored first file and the received second file.

* * * * *